Feb. 25, 1964 D. E. ROOP 3,122,649

TUNNEL DIODE FLIP-FLOP WITH TUNNEL RECTIFIER CROSS-COUPLING

Filed Sept. 20, 1960

INVENTOR.

David E. Roop

BY

ATTORNEY 3,122,649

United States Patent Office

Patented Feb. 25, 1964

3,122,649

TUNNEL DIODE FLIP-FLOP WITH TUNNEL RECTIFIER CROSS-COUPLING

David E. Roop, Upper Darby, Pa., assignor to Radio Corporation of America, a corporation of Delaware Filed Sept. 20, 1960, Ser. No. 57,166
9 Claims. (Cl. 307—88.5)

This invention relates to novel bistable circuits and, more particularly, to new and improved flip-flops which employ negative resistance diodes.

A flip-flop may be defined as a device, or circuit, having two stable operating states, two input terminals (or types of input signals), and two output terminals at which appear output signals indicative of the state of the flip-flop. The two output signals are present concurrently and are complementary in the sense that when one is high, the other is low, relatively speaking, and vice versa. Such a circuit also may have a trigger input, and its outputs normally are available as direct current (D.C.) levels.

The operating speed of a flip-flop is a function of the time required to switch the active elements thereof. It has been suggested that a very high speed flip-flop may be provided using two-terminal, negative resistance devices, such as tunnel diodes, as the active elements. Tunnel diodes, as is known, possess high switching speed capabilities and have low power requirements. However, most proposed tunnel diode flip-flops have a low fan-out, that is, they are capable of driving only a very limited number of circuits.

Accordingly, it is an object of this invention to provide an improved flip-flop.

It is another object of this invention to provide an improved flip-flop that has a very fast switching speed.

It is still another object of this invention to provide a high speed flip-flop that employs two active, cross-coupled circuit branches, each said branch having a negative resistance diode as the active element thereof.

It is yet another object of the present invention to provide an improved circuit of the type described that has improved fan-out capabilities.

These and other objects are accomplished according to the invention by a pair of similar circuit branches connected in parallel and each including the series combination of a pair of resistance elements and a biased diode having a region of negative resistance in its volt-ampere operating characteristic, a pair of threshold devices cross-coupling the negative resistance diodes, and means for applying switching pulses selectively to said diodes.

In the accompanying drawing, like reference characters refer to like components, and:

A two-terminal negative resistance device suitable for use as the active element in practicing the invention is one known in the art as a tunnel diode. Tunnel diodes, and the characteristics thereof, are described in an article by H. S. Sommers, Jr. in the Proceedings of the IRE, July 1959, at page 1201, and in other publications. Only those tunnel diode characteristics necessary for an understanding of the invention will be described here.

Figure 1:
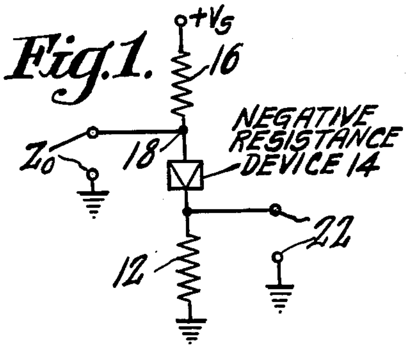
FIGURE 1 is a schematic diagram of a series bistable circuit useful in describing the invention.

As an aid to understanding the invention, consider the series circuit illustrated schematically in FIGURE 1.

The circuit includes, in the order named, a resistance element 12, a tunnel diode 14 (or other suitable device), and a resistance element 16 connected between a point of reference potential, illustrated by the conventional symbol for circuit ground, and a D.C. energizing source, designated $+V_s$. The voltage source $V_s$ may be, for example, a battery (not shown) having its positive terminal connected to the upper end of the resistor 16 and having its negative terminal connected to ground. When the negative resistance device 14 is a tunnel diode, the cathode thereof is connected to the ungrounded end of the resistor 12 and the anode is connected to the lower end of the resistor 16, as viewed in the drawing. The diode then is poled in the forward direction with respect to the voltage biasing source $V_s$. One of a pair of pulse input terminals 20 is connected to a junction point 18 between the tunnel diode 14 anode and the lower end of the resistor 16; the other of the terminals 20 is grounded.

Figure 2:
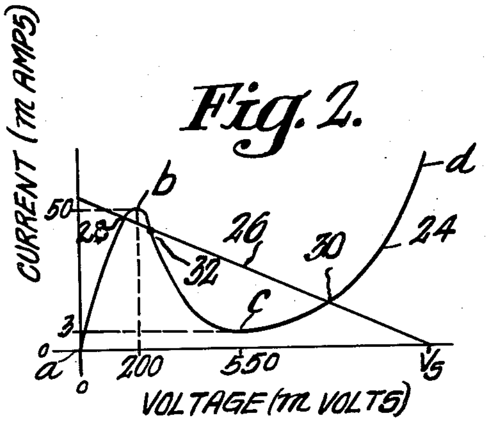
FIGURE 2 is a volt-ampere characteristic of one type of negative resistance device useful in practicing the invention.

The volt-ampere characteristic of a typical tunnel diode 14 is illustrated graphically in FIGURE 2 by the curve 24. Voltage is plotted along the abscissa and current is plotted along the ordinate. The characteristic 24 is known as an N-shaped volt-ampere characteristic because it resembles the letter N in shape when plotted with a current ordinate and voltage abscissa. The characteristic curve 24 has two regions *ab* and *cd* of positive resistance separated by a region *bc* of negative resistance. That is to say, the increment $\Delta V/\Delta I$ has a positive value in the regions *ab* and *cd* and a negative value in the region *bc*. The particular current and voltage values given in the drawing are for one type of gallium-arsenide tunnel diode. These values differ for different types of tunnel diodes, but the general shape of the characteristic curve 24 is typical for all tunnel diodes.

The values of the series resistors 12, 16 of FIGURE 1 may be selected so that the tunnel diode 14 has the load line 26 indicated in FIGURE 2. This load line intersects the positive resistance regions *ab* and *cd* of the curve 24 at points 28 and 30, respectively. These points 28 and 30 are points of stable operation, whereby the circuit is bistable. The load line 26 also intersects the characteristic curve 24 at a point 32 in the negative resistance region *bc*. The point 32 of intersection, however, is a point of unstable operation.

Switching pulses may be applied at the input terminals 20 to switch the circuit from one stable state to the other. Assume, that the circuit initially is in the low voltage, high current state defined by the point 28 of intersection in the region *ab*. The voltage across the diode 14 then is approximately 160 millivolts and the current is high, relatively speaking, approximately 47 milliamperes. The diode 14 may be switched to the high voltage, low current stable state by applying a positive pulse of sufficient amplitude at the input terminals 20.

If the input pulse has a greater amplitude than a critical value, current through the diode 14 exceeds that value corresponding to the peak *b* value, and the diode 14 switches rapidly through its negative resistance region. The diode 14 then stabilizes at the point 30 of high voltage, low current after termination of the input pulse and the switching transient. No switching occurs, however, if the amplitude of the input pulse is less than the critical value needed to increase the diode current above the current value corresponding to the peak *b* of the curve 24. Switching occurs in response to a lower amplitude input pulse if an inductor is connected in series with the resistor 16. A series-connected inductor effectively decouples the resistor 16 from the circuit during switching, and allows almost all of the current supplied by the input pulse to flow through the tunnel diode 14.

The diode 14 may be switched back to the stable state of low voltage, high current by applying a positive pulse at a pair of input terminals 22. One of the terminals 22 is connected to the cathode of the diode 14, the other terminal is grounded. Current through the diode 14 decreases to a value less than that corresponding to the transition point *c*, in the valley of the characteristic 24, if this input pulse is of sufficient amplitude. The diode 14 then switches rapidly through the negative resistance region and stabilizes at the point 28 of low voltage. Switching from the high to the low voltage state also may be accomplished by applying a negative pulse at the other input terminals 20.

Figures 3, 4:
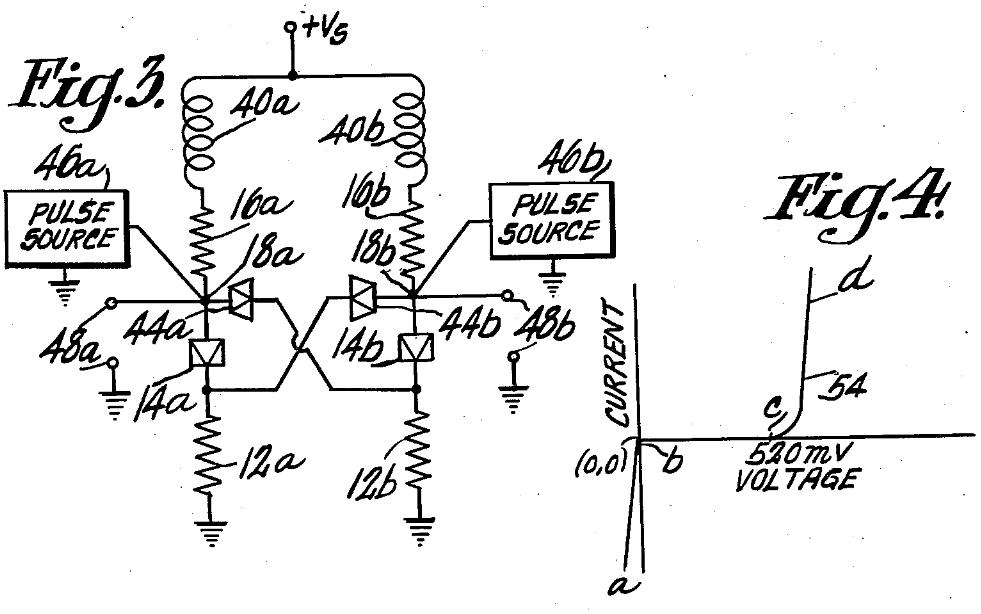
FIGURE 3 is a schematic circuit diagram of a flip-flop according to the invention.
FIGURE 4 is a volt-ampere characteristic of a tunnel rectifier, or backward diode.

A flip-flop circuit according to the invention is illustrated schematically in FIGURE 3. The circuit comprises two similar circuit branches connected in parallel between circuit ground and an energizing source, $+V_s$. Each branch differs structurally from the FIGURE 1 circuit only in the addition of a series inductor *40a* or *40b*. Accordingly, like components in the circuit branch on the left, as viewed in the drawing are identified by like numerical reference characters, followed by the letter "*a*." Like components in the circuit branch on the right are identified by like numerical reference characters, followed by the letter "*b*."

A pair of threshold devices *44a, 44b* cross-couples the tunnel diodes *14a, 14b* anode-to-cathode. A suitable threshold device for use in practicing the invention is one known in the art as a tunnel rectifier, or backward diode. A detailed description of such a device is given hereinafter. When the threshold devices *44a, 44b* are tunnel rectifiers, the anodes thereof are connected, respectively, to the anodes of the tunnel diodes *14a, 14b*, and the cathodes thereof are connected to the cathodes of the tunnel diodes *14b, 14a*, respectively.

Separate input current pulse sources *46a, 46b* for setting and resetting the flip-flop are connected between the junction points *18a, 18b*, respectively, and circuit ground. Each of these sources *46a, 46b*, when operative, supplies pulses of positive current, in the conventional sense, to a respective junction point *18a, 18b*. One of a first pair of ouput terminals *48a* is connected to the junction point *18a*. One of a second pair of output terminals *48b* is connected to the other junction point *18b*. The other terminal of each pair is grounded.

The threshold devices *44a, 44b* are preferably two-terminal devices which have very high resistance below a threshold voltage, and which exhibit a sharp change in resistance when the threshold voltage is exceeded. The tunnel rectifier is one such device. A tunnel rectifier may be thought of as a tunnel diode which has a negligible peak current (point *b*, FIGURE 2, for example) in the low voltage, forward biased condition.

The volt-ampere characteristic 54 of a typical tunnel rectifier is illustrated in FIGURE 4. The characteristic 54 has an almost vertical portion *ab* extending in a downward direction from the origin (O, O). This indicates that the diode has a very low resistance in the backward direction. Hence, the name "backward" diode. Practically no current flows through the device in the forward direction when the forward bias is less than the threshold voltage. The threshold voltage may be, for example, 520 millivolts corresponding to the point *c* in the drawing. Of course, different tunnel rectifiers may have different threshold voltages, and the value given above is by way of example only. Once the threshold voltage is exceeded, the resistance decreases sharply to a very low value as may be seen in FIGURE 4 by the almost straight and vertical portion *cd* of the characteristic 54. In the operation of the FIGURE 3 circuit, the tunnel rectifiers are never biased in the reverse direction.

The operation of the flip-flop may best be described with reference to FIGURE 2. It is assumed for purposes of discussion that each of the tunnel diodes *14a, 14b* has the same volt-ampere characteristic 24. The values of the resistors *12a, 16a* and *12b, 16b* in each circuit branch may be selected so that each of the tunnel diodes *14a, 14b*, respectively, has the load line 26. In addition, the resistors *12a, 12b* are selected so that, ideally, the threshold devices *44a, 44b* are nonconducting when the flip-flop is in either of its two stable states. In actual practice, depending upon the threshold values, a negligible amount of current may flow through these devices *44a, 44b* in the quiescent condition. The resistors *12a, 12b* then are selected to maintain this current at a minimum, which may be of the order of microamperes.

Each of the tunnel diodes *14a, 14b* goes to the low voltage stable state (point 28) when the circuit is energized initially. A positive current pulse applied at the junction point *18a* from the pulse source *46a* then switches the tunnel diode *14a* to the high voltage state (point 30). This input pulse biases the threshold device *44a* above the threshold (*c*), and a heavy current, relatively speaking, flows through the threshold device *44a* and the resistor *12b*. The temporary increase in current through the resistor *12b* during the transient raises the voltage, in a positive direction, at the cathode of the tunnel diode *14b*, thereby preventing this diode *14b* from switching to the high voltage state. The combination of the inductor *40a* and series resistor *16a* acts like a constant current source during the switching transient, allowing the flip-flop to be switched with a lower amplitude input signal than would be required in the absence of the inductor *40a*.

The tunnel diode *14a* stabilizes in the high voltage stable state at the termination of the input signal. The other tunnel diode *14b* is then in the low voltage stable state. This condition may represent the "set" state of the flip-flop. Of course, the flip-flop would have been switched to the reset state if the pulse source *46b* applied the first current pulse at the junction point *18b*.

The first flip-flop may be triggered from the "set" to the reset state by applying a current pulse at the junction point *18b*. This pulse adds sufficient current to the tunnel diode *14b* to switch this diode to the high voltage state. The current pulse also biases the threshold device *44b* above the threshold (*c*), whereby a heavy current flows temporarily through the threshold device *44b* and resistor *12a* to ground. The increase in voltage at the cathode of the tunnel diode *14a* due to this current increase causes the tunnel diode *14a* to switch to the low voltage state. This voltage increase has the same effect as applying a positive pulse at the cathode of the tunnel diode *14a*.

Switching of this diode *14a* is aided by the action of the threshold device *44a*, as follows. The voltage at the cathode of the tunnel diode *14b* decreases to a low value when the diode *14b* is switched to the high voltage, low current state. The voltage differential across the threshold device *44a* then exceeds the threshold (*c*), and current flows from the junction point *18a* to ground through the threshold device *44a* and the series resistor *12b*. This results in a decrease in tunnel diode *14a* current because the inductor *40a* acts to supply a constant current to the junction point *18a*. After the switching transient, both threshold devices *44a, 44b* are again biased at or below the threshold (*c*). The tunnel diode *14a* then is in the low voltage, high current state and the tunnel diode *14b* is in the high voltage, low current state. This condition may represent the "reset" state of the flip-flop.

It is thus seen that feedback through the threshold devices *44a, 44b* is in a direction to assure bistable operation of the flip-flop. The flip-flop may be triggered alternately between the "set" and "reset" states by applying pulses at the junction points *18a, 18b* alternately from the pulse sources *46a, 46b*, respectively.

Typical values of components for the FIGURE 3 flip-flop are as follows for one type of 50 milliampere peak current, gallium arsenide tunnel diode:

| | | |
|---|---|---|
| Resistors 12*a*, 12*b* | ohms | 7.5 |
| Resistors 16*a*, 16*b* | do | 22 |
| Inductors 40*a*, 40*b* | μhenry | 0.1 |
| $V_s$ | volt | 1.5 |

For any particular application, the total resistance in each circuit branch is selected in accordance with the number of stages to be driven by the flip-flop. The effect of connecting loads at the output terminals 48*a*, 48*b* is to draw current away from the tunnel diodes 14*a*, 14*b*. The diodes 14*a*, 14*b* must be biased so that the reduction in diode current due to loading does not cause a diode to switch from the high voltage state to the low voltage state. It should be noted that the flip-flop of the present invention has a greater fan-out, that is, it can drive a greater number of loads, than other known cross-coupled, negative resistance diode flip-flops. This is due to the fact that only a negligible amount of current, if any, is drawn by the threshold devices 44*a*, 44*b* in the cross-coupling network in the static condition. The cross-coupling network, therefore, does not load down the flip-flop.

What is claimed is:

1. A flip-flop comprising two similar circuit branches connected in parallel, each of said branches including the series combination of a pair of elements of fixed resistance connected by a two-terminal device having a region of negative resistance in its volt-ampere characteristic, and a pair of two-terminal threshold devices directly cross-coupling unlike terminals of the negative resistance devices.

2. A flip-flop comprising two circuit branches connected in parallel and each including the series combination of a pair of resistance elements, an inductor and a two-terminal device whose volt-ampere characteristic has two regions of positive resistance separated by a region of negative resistance, and a pair of two-terminal threshold devices cross-coupling the terminals of the negative resistance devices.

3. A flip-flop comprising: two circuit branches connected in parallel and each including the series combination of a pair of elements of fixed resistance and a negative resistance diode connected between said elements; and a pair of tunnel rectifiers directly cross-coupling the unlike terminals of the negative resistance diodes.

4. A flip-flop according to claim 3 wherein each said negative resistance diode is a tunnel diode.

5. A flip-flop comprising: two circuit branches connected in parallel and each including the series combination of a pair of resistance elements, an inductor and a two-terminal device having a region of negative resistance in its operating characteristic; means for biasing each said device for bistable operation; and a pair of voltage-sensitive threshold devices cross-coupling the terminals of the negative resistance devices.

6. A flip-flop comprising: a pair of two-terminal devices each of which has two regions of positive resistance separated by a region of negative resistance in the operating characteristic thereof; a pair of two-terminal threshold elements cross-coupling directly the unlike terminals of said negative resistance devices; and means for biasing each of said devices for bistable operation and for quiescently biasing said elements below the threshold.

7. A flip-flop comprising: a pair of tunnel diodes; a pair of threshold diodes cross-coupling directly the unlike terminals of said tunnel diodes; and means for biasing each of said tunnel diodes for bistable operation and for biasing said threshold diodes quiescently below the threshold.

8. The flip-flop as claimed in claim 7 wherein said threshold devices are tunnel rectifiers.

9. A flip-flop comprising: first and second circuit branches connected in parallel and each including the series combination of a pair of resistance elements, an inductor and a tunnel diode; a pair of tunnel rectifiers cross-coupling the terminals of said tunnel diodes; means including said resistance elements for biasing said tunnel diodes for bistable operation and for quiescently biasing said tunnel rectifiers below their threshold; and means for applying selectively to said tunnel diodes input pulses having amplitudes sufficient to bias said tunnel rectifiers above their thresholds.

References Cited in the file of this patent

FOREIGN PATENTS 166,800 Australia ---------------- Feb. 2, 1954